United States Patent Office 2,988,698
Patented June 13, 1961

2,988,698
MEASURING SYSTEMS
Pierre Paul Daniel Gaussens, 79 Ave. Ledru-Rollin, and Roger Georges Nonnenmacher, 50 Rue Berzelius, both of Paris, France
Filed Aug. 14, 1959, Ser. No. 16,112
2 Claims. (Cl. 324—98)

The present invention relates to an apparatus for studying the variations of amplitude of an A.C. voltage, particularly in electric power transmitting and distributing networks.

This application is a continuation-in-part of my application Serial Number 557,555, filed January 5, 1956, for "Measuring System," and now abandoned.

Variations in the amplitude of an A.C. voltage at a given point in an electrical network, particularly at the junction point of a user, constitute a disturbing factor for said user.

Up to now, study of the variations in amplitude of an A.C. voltage at a given point in an electrical network has been carried out either by means of a recording voltmeter which supplies a continuous graph illustrating said variations of amplitude of the voltage; or by means of a recording voltmeter which prints upon a strip of paper, at regular time intervals, the instantaneous value of the voltage amplitude; or by means of an apparatus which records upon a strip of paper the mean values of the voltage amplitude, calculated during short successive time intervals. This known prior art apparatus has not been convenient to use because of the very long time required to examine and interpret the recorded data and to make use of it.

An object of this invention is to study the variations in the course of time of the amplitude of an A.C. voltage or of a physical quantity such as a temperature or a pressure having an A.C. voltage analog. This is done by determining, in a given interval T, the mean linear value and also the mean quadratic value of the percentage of deviation of the voltage amplitude $e(t)$ from a reference value $e_0$ of said amplitude. Thus, the mean values of the mathematical expressions:

$$\left[\frac{e(t)-e_0}{e_0}\right] \text{ and } \left[\frac{e(t)-e_0}{e_0}\right]^2$$

respectively, are determined during a time interval T.

Another object of this invention is to obtain directly the values of the integral expressions:

$$\frac{1}{T}\int_0^T \frac{e(t)-e_0}{e_0}dt \text{ and } \frac{1}{T}\int_0^T \left[\frac{e(t)-e_0}{e_0}\right]^2 dt$$

which represent, respectively, the mean linear value and the mean quadratic value during the time interval T of the percentage of deviation of the voltage amplitude $e(t)$ from a reference value $e_0$ of said amplitude.

A still further object of the invention is to produce D.C. voltages which are proportional to the percentage of deviation:

$$\frac{e(t)-e_0}{e_0}$$

and to the square value thereof:

$$\left[\frac{e(t)-e_0}{e_0}\right]^2$$

and to integrate said voltages during a given time interval T.

With these objects in view, the present invention provides an apparatus including a voltage reducer, such as a transformer, to which this A.C. voltage with variable amplitude is applied, a rectifier fed by said reducer and connected with a filter, a stabilized D.C. voltage supply connected in opposition to the rectified and filtered voltage, and linear and quadratic integrating devices, to which the differential voltage thus obtained is applied, the reduction factor of said reducer and the value of the stabilized D.C. voltage being chosen so that, when the amplitude of the A.C. voltage is equal to the reference value thereof, said differential voltage is reduced to zero.

A fuller understanding and further objects of the present invention will be pointed out in the following description with reference to the annexed drawings which disclose, by way of example, the principles of the invention and the best mode of applying said principles.

In the drawings:

FIGURE 1 illustrates a circuit diagram of one embodiment of this invention for producing a D.C. voltage proportional to the percentage of deviation:

$$\frac{e(t)-e_0}{e_0}$$

and to integrate this D.C. voltage during a given time interval T.

Figure 1:
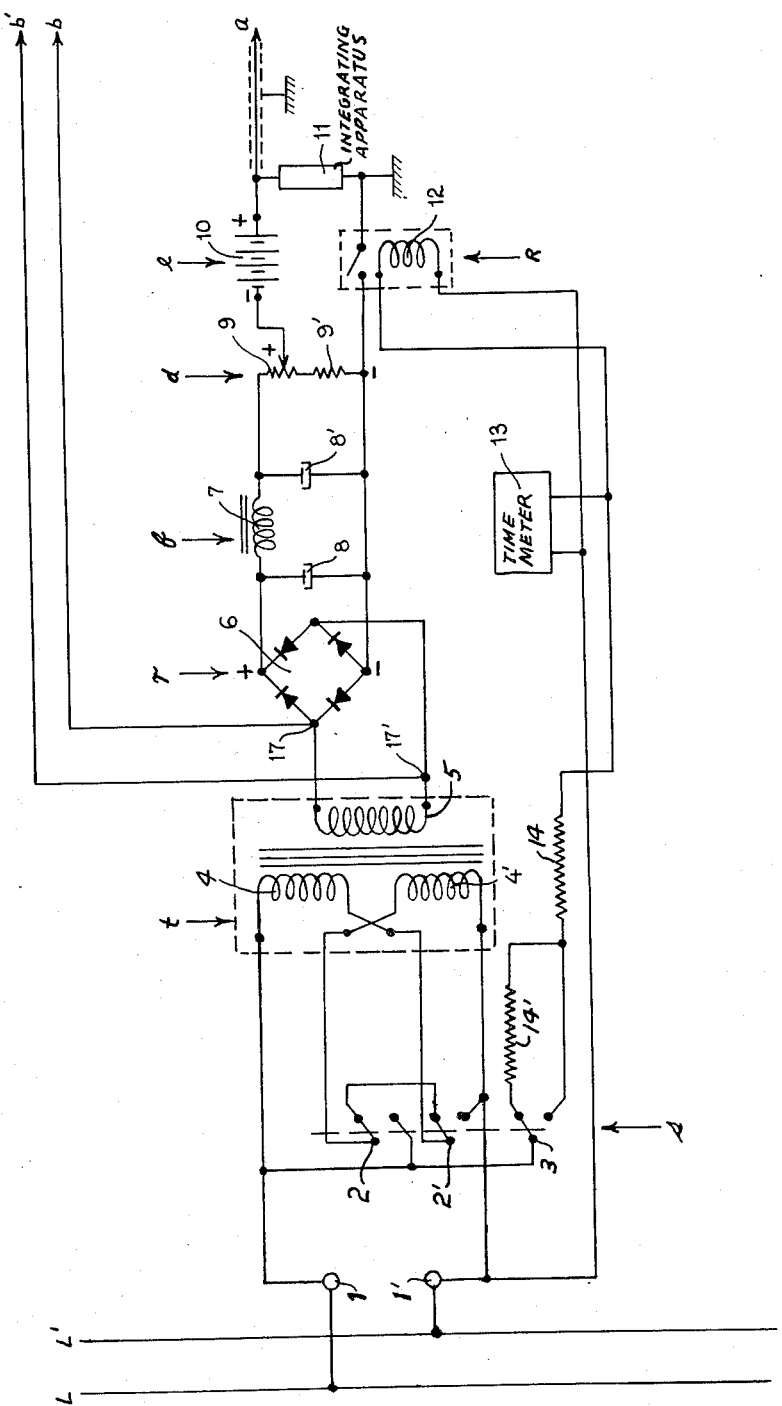
FIGURES 1 and 2 show the circuit diagram of a first embodiment.

The circuit illustrated in FIG. 1 is constituted as follows:

The input terminals 1 and 1' are connected outside the apparatus, respectively, with the two conductors L and L' of the electrical network at the point where the amplitude variations of the A.C. voltage are to be studied. Inside the apparatus, the input terminals 1 and 1' of the circuit are connected with the terminals of the two primary windings 4 and 4', respectively, of a voltage-reducing transformer $t$ through the poles 2 and 2' of a triple-pole, double-throw switch $s$.

The connections between the circuit input terminals 1, 1', the terminals of the primary windings 4, 4' of the transformer $t$, and the terminals of the poles 2, 2' of the switch $s$ are such that, when said switch is in one of its two positions, the A.C. voltage between the wires L, L' of the mains is applied to the primary windings 4, 4', connected in series with each other; whereas, in the other position of the switch $s$, the A.C. voltage is applied to the two same windings 4, 4', connected in parallel with each other.

Because of this arrangement, either of two nominal values of the voltage across conductors L and L', one being twice the nominal value of the other, will produce the same general level of voltage across the secondary winding 5. For example, nominal voltages of both 220 and 110 volts across conductors L and L' will both cause secondary winding voltages of about 50 volts, merely by operating switch to the proper one of its two positions.

The terminals of the secondary winding 5 of the transformer $t$ are respectively connected with the two input terminals of a full-wave rectifier 6: the two output terminals of said bridge are connected with the two input terminals of a low-pass pi-type filter $f$, comprising an inductor 7, and two shunt capacitors 8 and 8'. The two output terminals of the filter $f$ are connected with a voltage divider $d$ comprising a potentiometer 9 connected in series with a fixed resistor 9'. The movable tap of potentiometer 9, which is of positive polarity with respect to the voltage at the lower terminal of resistor 9', is connected to the negative terminal of a stabilized D.C. bucking voltage supply 10. The other positive terminal of this D.C. voltage supply 10 is connected with one of the two input terminals of an apparatus 11, the other terminal of which is connected to ground. In addition, the remaining (negative) output terminal of rectifier 6 is selectively connected to ground through a normally open contact 12' of relay 12. Consequently, whenever relay 12 is energized so that contact 12' is closed, the difference between the D.C. voltage at the output of the divider $d$ and the D.C. voltage of the stabilized supply 10 is applied to the terminals of the integrating apparatus 11.

In general, the apparatus 11 has the function of calculating and indicating the value of the integral of the variable D.C. voltage applied to its terminals during any time interval. Many integrating devices of this type are known. In the given embodiment, preferably a counter is used, the rotational speed of which is proportional to the D.C. voltage applied to its terminal; a counter of this type is technically known as an "O.K." counter, this latter designation being an abbreviation for the trademark "O'Keenan" of a leading manufacturer of such devices.

The coil 12 of relay R, which controls the selective application of the input to the apparatus 11, is fed, in parallel, with a time meter 13, by the A.C. voltage appearing on conductors L and L'. When the line voltage is at the higher of the two nominal values so that switch $s$ is in the position shown, the line voltage is applied through both the voltage dropping resistors 14 and 14' to the time meter 13 and relay 12. However, for the lower nominal voltage when switch $s$ is in the opposite position, only the resistor 14 appears in this circuit. In this way, the proper voltage level is applied to the time meter 13 and relay 12 for either value of nominal line voltage.

The above-described circuit of FIG. 1 operates as follows: $e$ represents the value of the amplitude of the network A.C. voltage, which ordinarily varies with time and which is applied to the input terminals 1 and 1' of the circuit and to the primary winding of the transformer $t$; $k$ is the transformation ratio of the latter, so that the A.C. voltage which is applied to the input of the rectifying bridge $r$ has an amplitude equal to $ke$. If $k'$ designates another constant which particularly depends upon the characteristics of the rectifying bridge $r$ and of the filter $f$, then the D.C. voltage applied to the series combination of potentiometer 9 and resistor 9' is equal to $kk'e$. Further, if $k''$ designates the division ratio of the divider $d$ and $E$ the D.C. voltage supplied by the stabilized source 10, the differential D.C. voltage which is applied to the terminals of the integrating apparatus 11 whenever relay R is energized, is equal to $(kk'k''e-E)=Ke-E$, where the letter K designates the product $kk'k''$.

According to an essential characteristic of the present invention, the ratio between the values of the constant K and of the voltage E supplied by the source 10 is chosen such that the above-mentioned differential voltage is zero whenever the amplitude $e$ of line voltage is precisely equal to the reference value $e_0$ of said amplitude. This may be stated mathematically by the expression $$Ke_0 - E = 0$$

By rearrangement of this expression, it follows that the parameters of the circuit are chosen so that:

$$\frac{K}{E} = \frac{1}{e_0} \text{ or } K = \frac{E}{e_0}$$

This condition being fulfilled, the differential D.C. voltage applied at any time to the terminals of the integrating apparatus 11 is equal to:

$$Ke - E = \frac{E}{e_0} \cdot e - E = E \cdot \frac{e-e_0}{e_0}$$

and is proportional to the percentage of deviation:

$$\frac{e-e_0}{e_0}$$

Consequently, the value indicated by the apparatus 11 after a time T is proportional to the integral:

$$\int_0^T \frac{e-e_0}{e_0} dt$$

As the proportionality factor, which is equal to the bucking voltage E, is independent of the reference value $e_0$, the apparatus 11 may be provided with a single scale applicable to all the reference voltages for which the apparatus can be adjusted by actuating the switch $s$ (110 volts and 220 volts in the shown example).

As the time interval T during which the differential voltage has been applied to the apparatus 11 is measured by the time meter 13, it is easy to determine from the value indicated at a given time by said apparatus 11 the linear mean value of the percentage of deviation:

$$\frac{e-e_0}{e_0}$$

during any time interval T, which is then actually the integral:

$$\frac{1}{T}\int_0^T \frac{e-e_0}{e_0} dt$$

One of the essential advantages of the above-described circuit is that it can easily be fitted to a large member of varied values of the reference voltage $e_0$ and particularly to high values of this reference voltage $e_0$.

As this adjustment is to be carried out without interfering with the relation $Ke_0=E$, for the above-mentioned reasons, it becomes possible, on the one hand, to make use of the same source of D.C. voltage of amplitude E for all the reference values $e_0$ under consideration, provided the product $Ke_0=kk'k''e_0$ is kept constant and equal to E. With this arrangement, it is no longer necessary to change the source of D.C. voltage 10 each time that the apparatus according to the invention is to be adjusted to a new reference value $e_0$. On the other hand, it becomes possible to make use of a low D.C. voltage E, having an utmost value of a few tens of volts, which may be supplied by a light and compact battery 10, even for high values of the reference voltage amplitude $e_0$, for instance several thousands of volts. Since $$K=kk'k''$$

is proportional to the transformation ratio K of the reducing transformer $t$, it is enough to choose a transformer $t$ having a very high and preferably adjustable ratio $k$, so as to adjust the values of K to the values of $e_0$. In the example above described, this result is obtained by the switching of the two primary windings 4, 4' of the transformer $t$ by means of the switch $s$.

As it is only possible to modify the reduction ratio $k$ of the transformer $t$ in a discontinuous way, the adjustment of the potentiometer 9 permits continuous variation of the ratio $k''$ of the divider $d$. In this way also, the coefficient $K=kk'k''$ may be varied continuously, thus permitting accurate adjustment of the value of K so that the differential voltage $Ke_0-E$ is strictly equal to zero. The potentiometer 9 thereby makes possible a very accurate gauging of the apparatus.

When the line voltage is not applied on the input terminals 1 and 1' of the apparatus, the relay R is not energized, and its contact 12' is consequently open. This arrangement prevents the bucking voltage supply 10 from uselessly feeding in such a case a high current, which could damage the integrating apparatus 11.

Figure 2:
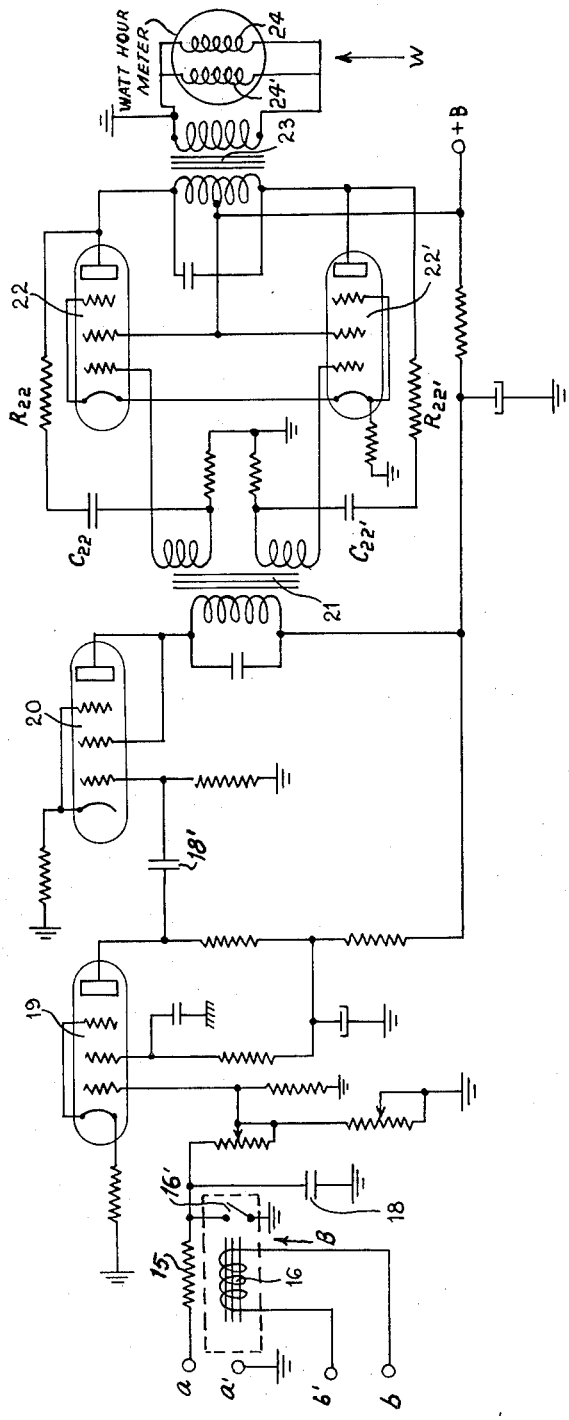

The portion of this first embodiment of this invention shown in FIG. 2 is a circuit to produce a D.C. voltage proportional to the square of the percentage of deviation, that is:

$$\left[\frac{e(t)-e_0}{e_0}\right]^2$$

and to integrate this D.C. voltage during a given time interval T.

The circuit of FIG. 2 receives between its terminal $a$ which is connected to terminal $a$ of the circuit of FIG. 1 and its terminal $a'$ which is connected to ground, the differential D.C. voltage proportional to the percentage of deviation:

$$\frac{e(t)-e_0}{e_0}$$

In the circuit of FIG. 1, this differential D.C. voltage is applied to the terminals of the integrating apparatus 11, when the relay R is energized. The D.C. voltage applied to the terminals $a$, $a'$ is transformed by a vibrator B into an A.C. voltage, the amplitude of which is also proportional to the percentage of deviation:

$$\frac{e(t)-e_0}{e_0}$$

The vibrator B includes, as usual, a movable contact blade 16', the heel of which is grounded and which, when attracted by an electromagnet 16, makes contact with a stationary contact connected with one terminal of a load resistor 15, the other terminal of which is connected with the input terminal $a$ of the circuit. The coil of the electromagnet 16 is fed, through the terminals $b$, $b'$ (respectively connected to the terminals $b$, $b'$ of FIG. 1) by an A.C. voltage drawn from the terminals 17, 17', of the secondary of the transformer $t$ of FIG. 1. The D.C. voltage, which is applied to the terminals of the load resistor 15 when the contact blade 16' bears upon the stationary contact, is interrupted each time the electromagnet 16 ceases to attract said blade 16'. Consequently an alternating voltage appears across resistor 15, which has the frequency of the A.C. voltage of the electric network (for instance 50 cycles). The alternating pulsing voltage thus produced comprises a succession of rectangular pulses, which is smoothed to form an A.C. voltage by means of filter capacitor 18 connected between the right-hand terminal of resistor 15 and ground. The value of this capacitor 18 is chosen so that it presents an appreciable impedance for the fundamental component of the pulsed voltage, the frequency of which is equal to the frequency of the network, and much lower impedances for its harmonic components, which are consequently strongly reduced. The A.C. voltage on the terminals of the capacitor 18 has also an amplitude proportional to the percentage of deviation:

$$\frac{e(t)-e_0}{e_0}$$

This A.C. voltage is then amplified by an A.C. amplifier including the four electron tubes 19, 20, 22, 22' of the pentode type. The tubes 19 and 20 are connected in a convention manner: the tube 19 receives on its control grid the A.C. voltage to be amplified and transmits, through a condenser 18', the A.C. component of its plate voltage to the control grid of the tube 20. The plate load of the tube 20 is constituted by a transformer 21, the two secondary windings of which are connected so as to produce two A.C. potentials in opposite phase to each other, which respectively drive the control grids of the two push-pull connected tubes 22, 22'.

As the connections of these four electron tubes are perfectly conventional and well-known, it is not necessary to describe them in detail. It must only be noted that a negative feedback is secured by the resistor $R_{22}$ connected in series with the capacitor $C_{22}$, between the plate and the grid of the tube 22 and by the resistor $R_{22}$ connected in series with the capacitor $C_{22}$, between the plate and the grid of the tube 22'.

The common plate load of the tubes 22, 22' includes the primary of the impedance matching transformer 23 which is provided with a center-tap connected with the positive voltage terminal B which is connected with the positive pole of a source of stabilized high voltage (not shown).

The single secondary winding of the impedance matching transformer 23 supplies, with a small inner impedance, an A.C. voltage, the amplitude of which is also proportional to the percentage of deviation:

$$\frac{e(t)-e_0}{e_0}$$

the proportionality coefficient being itself proportional to the amplification factor of the amplifier formed by the tubes 19, 20, 22, 22', and by the transformers 21, 23.

This A.C. voltage is applied in parallel to the four input terminals of the watt-hour meter W having two identical "voltage coils" 24 and 24' of high impedance; such a special type of watt-hour meter with two identical coils of high impedance may be obtained by substituting for the "current coil" of low impedance of a watt-hour meter of conventional type, a second "voltage coil" of high impedance.

The customary watt-hour meter comprises a rotating element which rotates with an angular velocity proportional at each instant to the product of the voltage applied to its "potential coil" by the current fed to its "current coil" and the cosine of the phase angle between these two. Consequently, throughout any given period of time the number of revolutions of the rotating element which are recorded provide a measure of the integral ever that period of time of the watts monitored by the meter, so that watt-hours may, for example, be recorded thereby. It follows, therefore, that when the same input is applied to both the coils of the meter W, the rotating element will rotate with an angular velocity proportional to the square of such input. Also over any given period of time, the meter will integrate throughout such period the square of the particular input applied thereto.

As the A.C. current flowing through each of the coils 24, 24' of the meter W is proportional to the A.C. voltage produced at the terminals of the secondary winding of the transformer 23, and thereby also to the percentage of deviation:

$$\frac{e(t)-e_0}{e_0}$$

the torque applied upon the moving element of said watt-hour meter W is proportional to the square of this percentage of deviation, so that, when the network voltage has been applied during a time interval T on the input terminals 1, 1' of the circuit of FIG. 1, the watt-hour meter W indicates a value proportional to:

$$\int_0^T \left[\frac{e(t)-e_0}{e_0}\right]^2 dt$$

simply by dividing this value by the duration of the time interval T measured by the time-meter 13 of the circuit of FIG. 1, there is obtained a quantity which is proportional to the quadratic mean value of the percentage of deviation:

$$\frac{e(t)-e_0}{e_0}$$

It is the high power consumption of the watt-hour meter W, at least 8 to 10 volt-amperes, which necessitates the amplification of the D.C. voltage produced by the circuit of FIG. 1 and transformed by the vibrator B and the capacitor 18 to an A.C. voltage.

Figure 3:
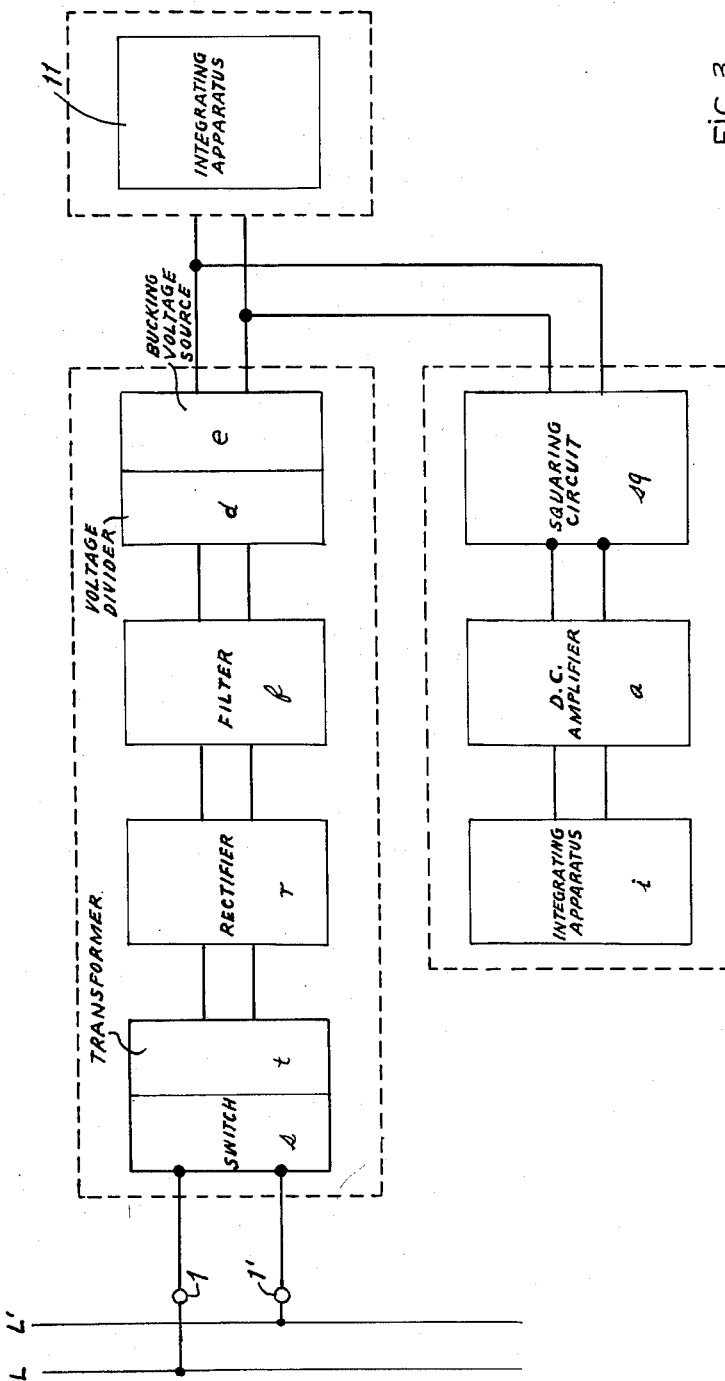
FIGURE 3 is a block diagram of a second embodiment.

The second embodiment, the electric diagram of which is illustrated in FIG. 3, is also constituted by two circuits: the first, to form a D.C. voltage proportional to the percentage of deviation:

$$\frac{e(t)-e_0}{e_0}$$

and to integrate this D.C. voltage during a predetermined time interval T, is identical to the corresponding circuit of the first embodiment, illustrated in FIG. 1. Its various components, the switch $s$, the reducing transformer $t$, the rectifier $r$, the filter $f$, the voltage divider $d$, the source of stabilized D.C. voltage and the linear integrating apparatus 11 have been represented by blocks in the upper part of FIG. 3. It is unnecessary to describe anew the design and the working of these various components of the circuit of FIG. 1.

The second circuit of the second embodiment illustrated in the lower part of FIG. 3 is constituted as follows and differs from the corresponding part of the first embodiment, illustrated in FIG. 2:

The differential D.C. voltage produced at the output of the circuit $d$, $e$ is applied on a circuit 19 which is adapted to generate a D.C. voltage proportional to the square of said differential voltage. A large number of "squaring" circuits of that type are known and can be used in such a case, for instance a diode having a nonlinear characteristic.

The output potential of the circuit 19 is thereby proportional to the square of the percentage of deviation:

$$\frac{e(t)-e_0}{e_0}$$

This voltage is applied to the input of a D.C. amplifier $a$ and the resulting amplified voltage, which is proportional to:

$$\left[\frac{e(t)-e_0}{e_0}\right]^2$$

is then applied to the terminals of a linear integrating apparatus $i$, which can be of the same type as the integrating apparatus 11; it can be, for instance, a counter having a speed proportional to the voltage applied upon its terminals, such as an O.K. counter. It will evidently indicate a value proportional to:

$$\int_0^T \left[\frac{e(t)-e_0}{e_0}\right]^2 dt$$

thereby proportional to the quadratic mean value of the percentage of deviation:

$$\frac{e(t)-e_0}{e_0}$$

Figure 4:
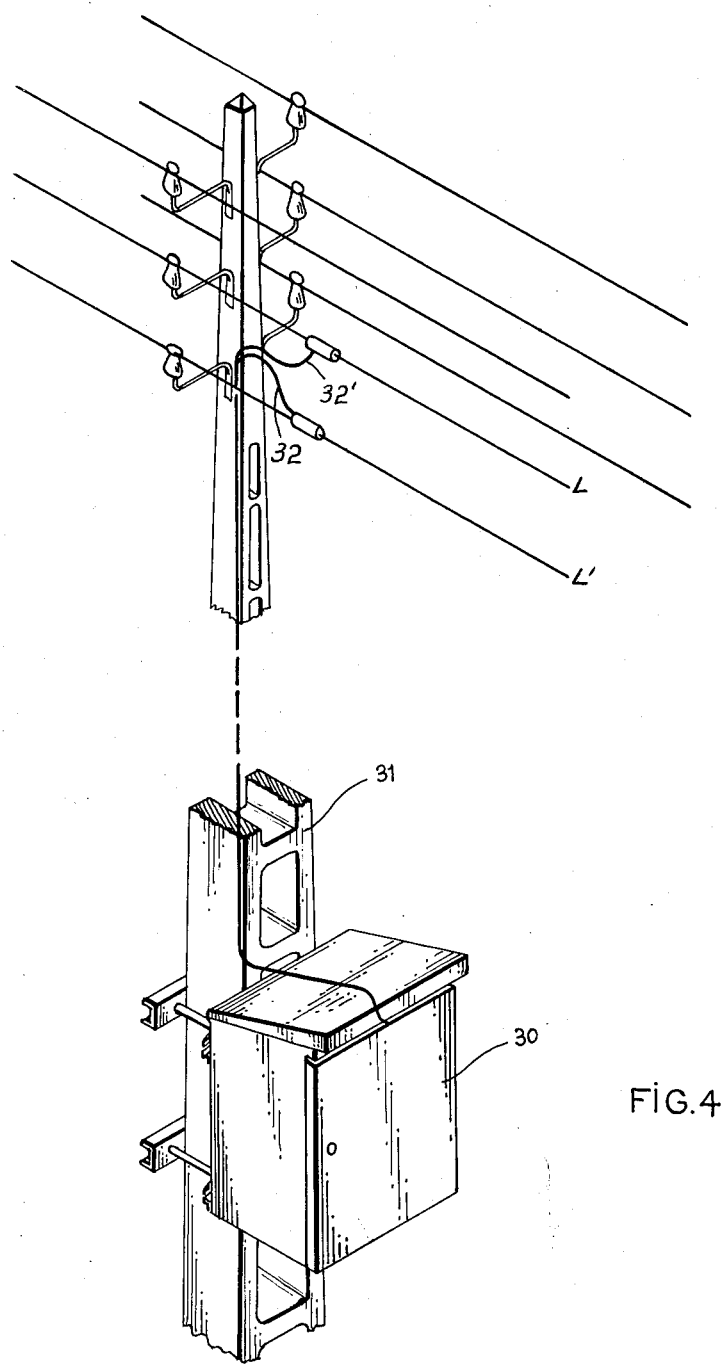
FIGURE 4 is a perspective view showing the apparatus of the invention located on a transmission line pole.

As shown in FIG. 4, the apparatus according to the invention is housed in a small chest of sheet iron 30, which includes the various circuit components, and shelters them from shocks and bad weather.

The chest 30 can be located as well inside a station or outside a user's house, as illustrated in FIG. 4, on a post 31 which supports the distribution mains, L, L'. The potential of the lines L, L' is fed to the chest 30 by two insulated conductors 32, 32'. The power necessary for the measurement ranges about 15 to 20 volt-ampere, plus 60 to 80 volt-ampere to energize several auxiliary circuits of the apparatus.

Of course, the apparatus according to the invention permits determination of the linear and quadratic mean values of the percentage of deviation from their reference values of all physical quantities, such as electric power, symmetrical components of multiphase potentials, frequencies, rotation speeds, etc., provided that they can be transformed to A.C. or even D.C. voltages analogs, the amplitude of which is proportional to said quantities.

If the obtained voltage is a D.C. voltage, it can, for instance, be applied to the input of the divider $d$ of the circuit of FIG. 1.

While there have been shown and described the fundamental novel features of the invention, it will be understood that various changes in form detail and operation may be made by those skilled in the art, without departing from the spirit of the invention. It is the intention, therefore, to be limited only as indicated by the scope of the following claims.

What is claimed is:

1. A measuring system for determining the mean linear value of the percentage of deviation of the varying amplitude of an A.C. potential from a reference value, particularly for measuring potential disturbances in power transmitting mains, including a reducing transformer with two primary coils, a multi-pole multi-throw switch arranged so as to apply the varying A.C. potential to both primary coils connected in parallel when said varying A.C. potential is in a lower voltage range and connected in series when said varying A.C. potential is in an upper voltage range, a rectifier connected to the output of said transformer, a smoothing circuit connected in series with said rectifier, a potentiometer connected as an adjustable voltage divider to the output of said smoothing circuit, a source of constant D.C. voltage connected in opposition to said adjustable divider, so as to produce the difference between the rectified and smoothed potential and said constant D.C. voltage, a time-meter connected to said switch so as to be operated therethrough by the A.C. potential, a relay, the coil of which is also connected to said switch so as to be operated therethrough by the A.C. potential, and an integrating D.C. meter connected to said source of constant D.C. voltage and to said adjustable divider through the contacts of said relay, so as to be subjected to the differential potential only when said relay is energized.

2. A measuring system for determining the mean linear and quadratic values of the percentage of deviation of the varying amplitude of an A.C. potential from a reference value, particularly for measuring potential disturbances in power transmitting mains, including a reducing transformer with two primary coils, a multi-pole multi-throw switch arranged so as to apply the varying A.C. potential to both primary coils connected in parallel when said varying A.C. potential is in a lower voltage range and connected in series when said varying A.C. potential is in an upper voltage range, a rectifier connected to the output of said transformer, a smoothing circuit connected in series with said rectifier, a potentiometer connected as an adjustable voltage divider to the output of said smoothing circuit, a source of constant D.C. voltage connected in opposition to said adjustable divider so as to produce the difference between the rectified and smoothed potential and said constant D.C. voltage, a time-meter connected to said switch so as to be operated therethrough by the A.C. potential, a relay, the coil of which is connected to said switch so as to be operated therethrough by the A.C. potential, an integrating D.C. meter connected to said source of constant D.C. voltage and to said adjustable divider, through the contacts of said relay so as to be subjected to the differential potential only when said relay is energized, a vibrator mounted so as to be energized by the A.C. potential and to convert said D.C. differential potential to an A.C. potential, means to filter said last A.C. potential, an A.C. amplifier, to the input of which said filtered A.C. potential is fed, impedance matching means connected to the output of said amplifier, and a watthour meter being constructed to have two high impedance potential coils including a first high impedance potential coil and also a second high impedance potential coil substituted for the usual current coil, both of which coils are supplied in parallel with the output voltage of said amplifier, through said impedance matching means, so as to square said output voltage and integrate the square thereof.

References Cited in the file of this patent

UNITED STATES PATENTS

| | | |
|---|---|---|
| 599,302 | Scheefer | Feb. 15, 1898 |
| 773,837 | Whitney | Nov. 1, 1904 |
| 787,256 | Anthony | Apr. 11, 1905 |
| 2,077,833 | Gieringer | Apr. 20, 1937 |
| 2,162,874 | Wurmser | June 20, 1939 |
| 2,762,975 | Bregar | Sept. 11, 1956 |